United States Patent
Peng et al.

(10) Patent No.: US 6,999,800 B2
(45) Date of Patent: Feb. 14, 2006

(54) METHOD FOR POWER MANAGEMENT OF A SMART PHONE

(75) Inventors: Yu-Chun Peng, Taipei (TW); Ching-Hsiang Chang, Taipei (TW); Tzu-Hsun Tung, Taipei (TW); Hsi-Cheng Yeh, Taoyuan (TW)

(73) Assignee: High Tech Computer Corp., Taoyuan (TW)

( * ) Notice: Subject to any disclaimer, the term of this patent is extended or adjusted under 35 U.S.C. 154(b) by 231 days.

(21) Appl. No.: 10/609,365

(22) Filed: Jul. 1, 2003

(65) Prior Publication Data

US 2004/0082362 A1   Apr. 29, 2004

(30) Foreign Application Priority Data

Oct. 23, 2002   (TW) ................ 91124491 A

(51) Int. Cl.
*H04B 1/38*   (2006.01)
(52) U.S. Cl. .............. 455/574; 455/571; 455/572; 455/127.1; 455/127.5
(58) Field of Classification Search ........... 455/574, 455/571, 572, 573, 418, 556.2, 127.1, 127.5
See application file for complete search history.

(56) References Cited

U.S. PATENT DOCUMENTS

| | | | |
|---|---|---|---|
| 6,535,749 B1 * | 3/2003 | Iwata et al. ............ | 455/556.2 |
| 6,725,060 B1 * | 4/2004 | Chhatriwala et al. .... | 455/556.2 |
| 6,813,344 B1 * | 11/2004 | Lemke ................ | 379/142.06 |
| 2001/0041606 A1 * | 11/2001 | Aoki et al. ............ | 455/575 |
| 2002/0103935 A1 * | 8/2002 | Fishman et al. ........ | 709/246 |
| 2002/0173344 A1 * | 11/2002 | Cupps et al. ........... | 455/566 |
| 2003/0084194 A1 * | 5/2003 | Ryan .................... | 709/250 |
| 2003/0117117 A1 * | 6/2003 | Zinn et al. ............. | 323/273 |
| 2003/0117316 A1 * | 6/2003 | Tischer ................. | 342/357.1 |
| 2003/0135771 A1 * | 7/2003 | Cupps et al. ........... | 713/320 |
| 2003/0139150 A1 * | 7/2003 | Rodriguez et al. ...... | 455/90 |
| 2004/0235446 A1 * | 11/2004 | Flaherty et al. ........ | 455/352 |

* cited by examiner

*Primary Examiner*—Urban Edward
*Assistant Examiner*—Dai Phuong
(74) *Attorney, Agent, or Firm*—Birch,Stewart,Kolasch & Birch,LLP

(57) ABSTRACT

A method for power management of a smart phone. The method comprises steps of resetting the smart phone, searching for network service, operating the mobile phone system in standby mode and a PDA system in normal mode when connected to a network, switching the mobile phone system to connection mode when establishing communication with a remote terminal, switching the mobile phone system to sleep mode when the mobile phone system has been idle for a first time period, switching the PDA system to sleep mode when the PDA system has been idle for a second time period, and implementing power detection to switch the mobile phone and PDA system to off mode when the detected power is lower than a first and second threshold respectively.

15 Claims, 10 Drawing Sheets

METHOD FOR POWER MANAGEMENT OF A SMART PHONE

BACKGROUND OF THE INVENTION

1. Field of the Invention

The present invention relates to a method for power management and particularly to power management of a smart phone having two subsystems, a mobile phone, and a Personal Digital Assistant (PDA), which achieves long battery life and reduces unnecessary power loss due to system operation.

2. Description of the Prior Art

The development of manufacturing techniques for mobile phones and PDAs has resulted in significant improvements in size and cost, adding to the popularity of these devices. Moreover, to better serve users with a greater need for mobility, smart phones, a combination of the PDA and mobile phone, have become commercially available. Smart phones combine mobile telephony and PDA functionality in a single device.

Smart phones combine two sub-systems, the PDA and the mobile phone, sharing one battery, and therefore require efficient power management to reduce unnecessary power consumption and extend battery life. Traditionally, however, power management is dedicated to the PDA or mobile phone only. Single system power management is inefficient for a smart phone having two sub-systems. It is impossible for example, to engage the mobile phone the PDA sub-systems simultaneously. The traditional power management system, however, allocates full power to both sub-systems, even if full power is only required by one sub-system.

SUMMARY OF THE INVENTION

The object of the present invention is to provide a power management system for a smart phone that achieves long battery life and reduces unnecessary power loss due to system operation.

The present invention provides a method for power management of a smart phone having a power system, a mobile phone system operated in a standby, sleep, connection or off mode, and a PDA system operated in a normal, sleep or off mode. The method includes steps of resetting the smart phone, locating network service for the mobile phone system, operating the mobile phone system is in standby mode and the PDA system in normal mode when the network is located and connected to, switching the mobile phone system from standby mode to connection mode when establishing communication with a remote terminal of the network, switching the mobile phone system from standby mode to sleep mode when the mobile phone system has been idle for a first period of time, switching the PDA system from normal mode to sleep mode when the PDA system has been idle for a second period of time, and implementing a power detection method. The power detection method includes steps of detecting an amount of power of a source in the power system, switching the mobile phone system to off mode when the detected amount is less than a first threshold, and switching the PDA system to off mode when the detected amount is less than a second threshold.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, given by way of illustration only and thus not intended to be limitative of the present invention.

DETAILED DESCRIPTION OF THE INVENTION

FIGS. 1~9 are flowcharts of a method for power management of a smart phone according to one embodiment of the invention. This method is applied to a smart phone having a PDA and mobile phone system which function independently from each other and share one power system. The mobile phone system can be operated in a standby, sleep, connection or off mode while the PDA system can be operated in a normal, sleep or off mode. In such a context, there are eight power supply modes:

Mode A in which the PDA system is operated in normal mode while the mobile phone system is in sleep mode, Mode B in which the PDA system is operated in normal mode while the mobile phone system is in standby mode, Mode C in which the PDA system is operated in sleep mode while the mobile phone system is in standby mode, Mode D in which the PDA system is operated in normal mode while the mobile phone system is in connection mode, Mode E in which the PDA system is operated in normal mode while the mobile phone system is in off mode, Mode F in which both of the PDA and mobile phone system are operated in sleep mode, Mode G in which the PDA system is operated in sleep mode while the mobile phone system is in off mode, and Mode H in which the PDA system is operated in sleep mode while the mobile phone system is in connection mode.

Figure 1:
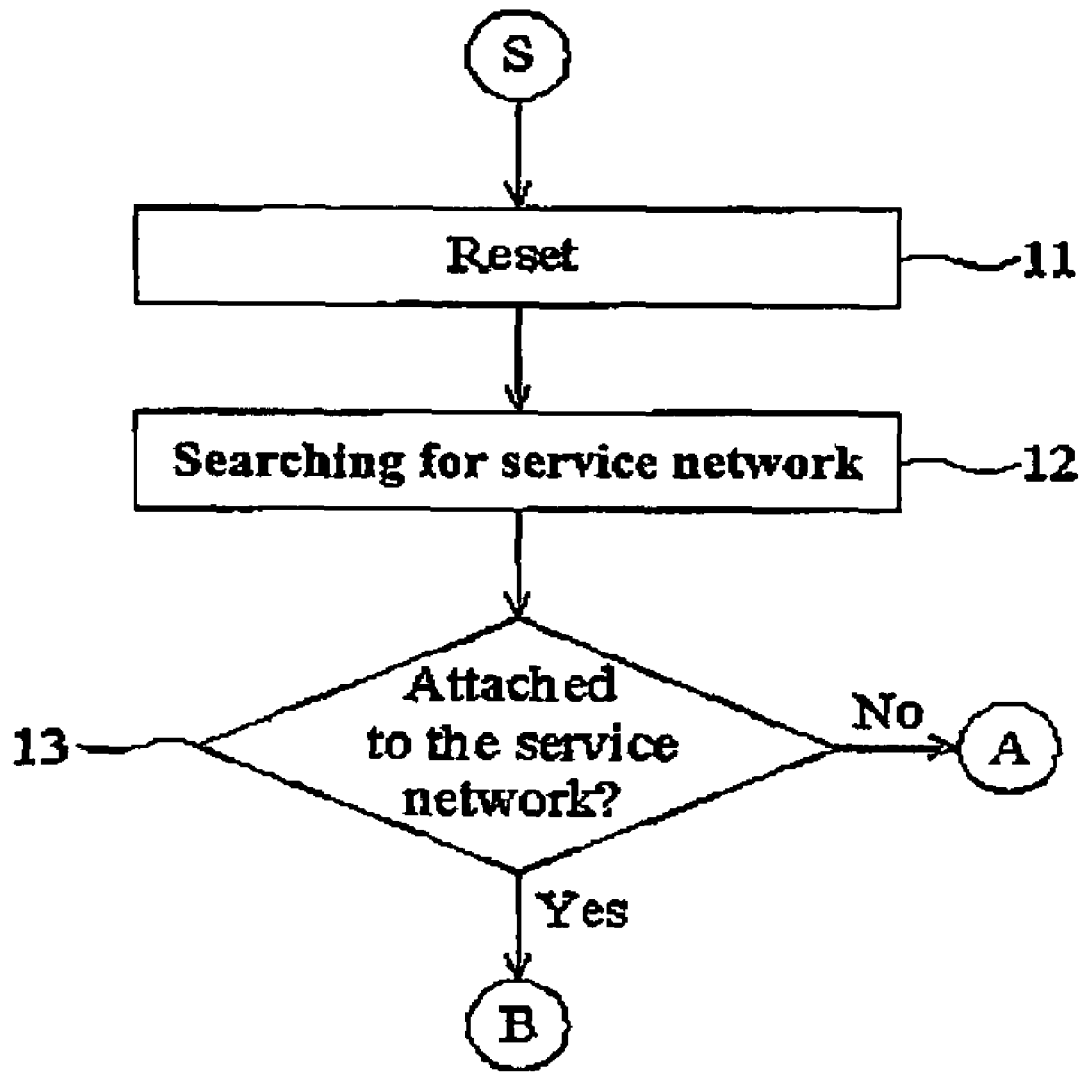
FIG. 1 is a flowchart of a main procedure S of a method for power management of a smart phone according to one embodiment of the invention.

FIG. 1 is a flowchart of a main procedure S of the method for power management of a smart phone according to the embodiment of the invention.

In step 11, the smart phone is reset when being turned on.

In step 12, the smart phone searches for network service for the mobile phone system.

In step 13, sub-procedure B is implemented if the network is located and connected to by the mobile phone system; otherwise, sub-procedure A is implemented.

Figure 2:
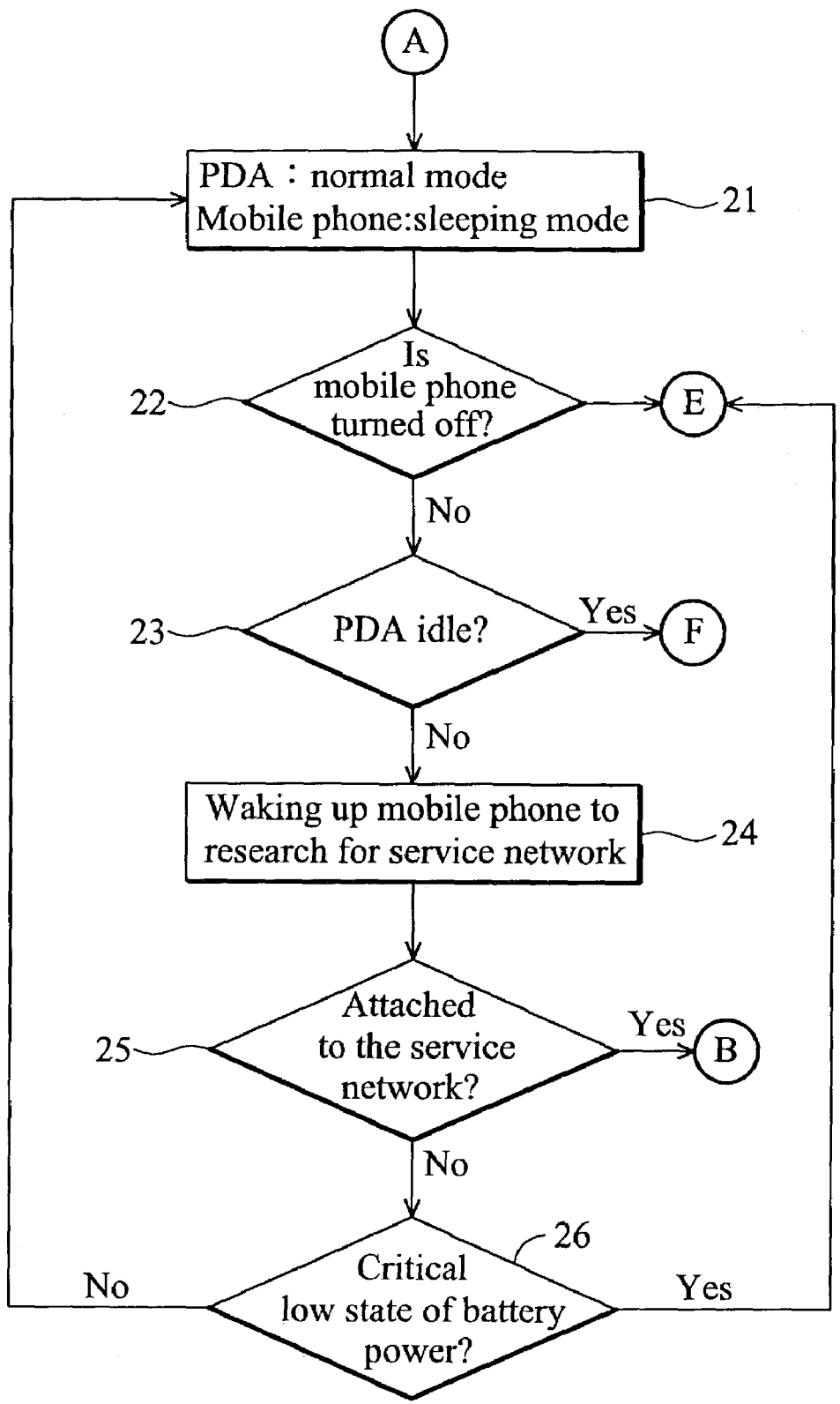
FIG. 2 is a flowchart of a sub-procedure A of a method for power management of a smart phone according to one embodiment of the invention.

FIG. 2 is a flowchart of sub-procedure A.

In step 21, the PDA system is operated in normal mode while the mobile phone system is in sleep mode.

In step 22, it is determined whether the mobile phone system is turned off. If so, sub-procedure E is implemented; otherwise, step 23 is implemented.

In step 23, it is determined whether the PDA system has been idle for a predetermined period of time, such as 5 minutes. If it has, sub-procedure F is implemented; otherwise, step 24 is implemented.

In step 24, the mobile phone system wakes and searches for network service after remaining in sleep mode for a predetermined period of time, such as 3 minutes.

In step 25, it is determined whether the mobile phone system has successfully connected to the network. If so, sub-procedure B is implemented; otherwise, step 26 is implemented.

In step 26, power detection is implemented to determine whether the amount of power of the battery in the power system is less than a first threshold. If so, the battery is at a critically low level and sub-procedure E is implemented; otherwise, step 21 is implemented.

Figure 3:
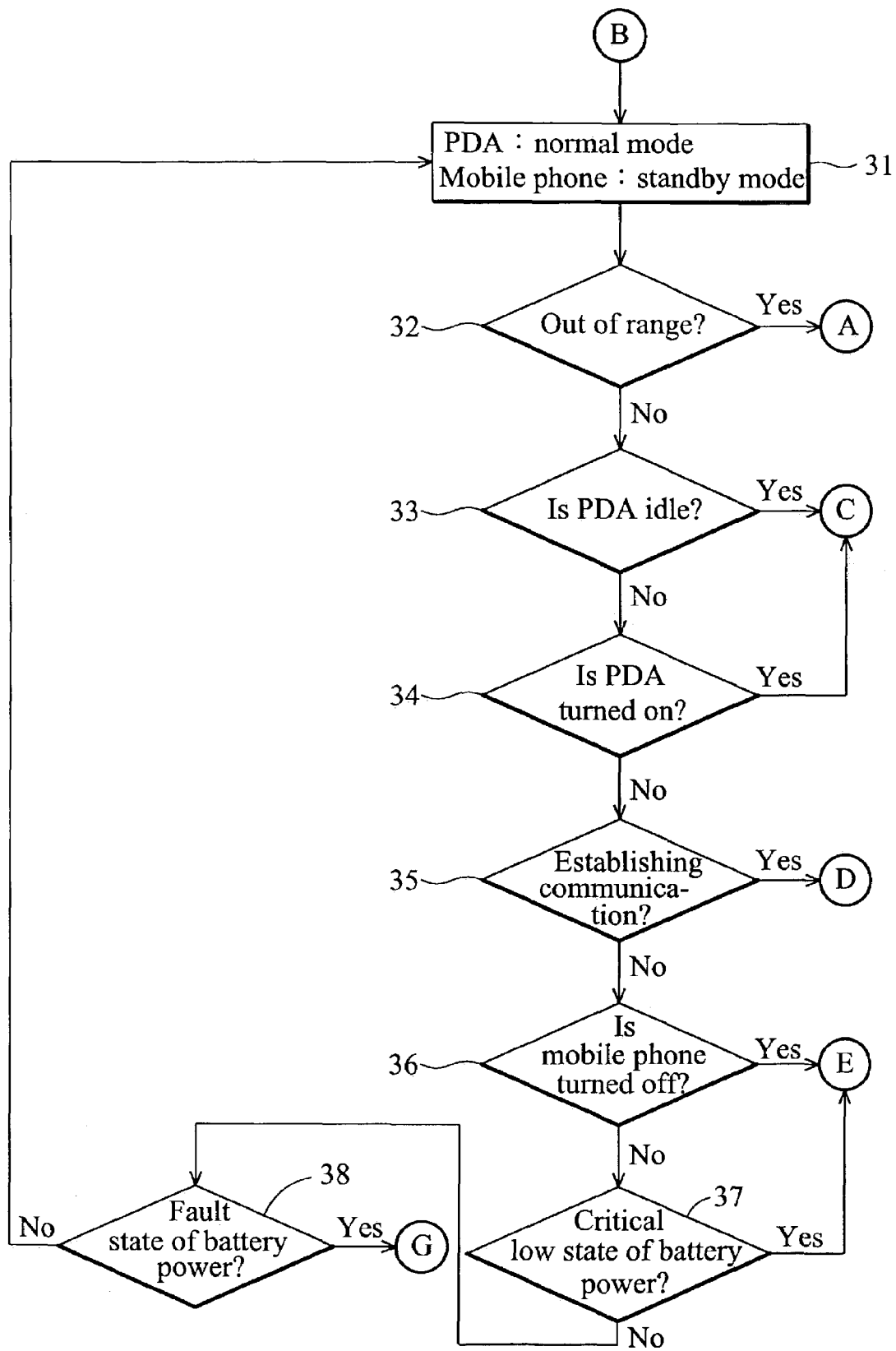
FIG. 3 is a flowchart of a sub-procedure B of a method for power management of a smart phone according to one embodiment of the invention.

FIG. 3 is a flowchart of sub-procedure B.

In step 31, the PDA system is operated in normal mode while the mobile phone system is in standby mode.

In step 32, it is determined whether the smart phone is out of network range and has failed to connect to the network service. If so, sub-procedure A is implemented; otherwise, step 33 is implemented.

In step 33, it is determined whether the PDA system has been idle for a predetermined period of time, such as 5 minutes. If so, sub-procedure C is implemented; otherwise, step 34 is implemented.

In step 34, it is determined whether the PDA system is turned off. If so, sub-procedure C is implemented; otherwise, step 35 is implemented.

In step 35, it is determined whether there is an outgoing or incoming call requiring the mobile phone system to establish communication with a remote terminal of the network. If so, sub-procedure D is implemented; otherwise, step 37 is implemented.

In step 36, it is determined whether the mobile phone system is turned off. If so, sub-procedure E is implemented; otherwise, step 37 is implemented.

In step 37, power detection is implemented to determine whether the amount of power in the battery of the power system is less than the first threshold. If so, the battery is at a critically low level and sub-procedure E is implemented; otherwise, step 38 is implemented.

In step 38, power detection is implemented to determine whether the amount of power in the battery of the power system is less than a second threshold. If so, the battery is in fault state and sub-procedure G is implemented; otherwise, step 31 is implemented.

Figure 4:
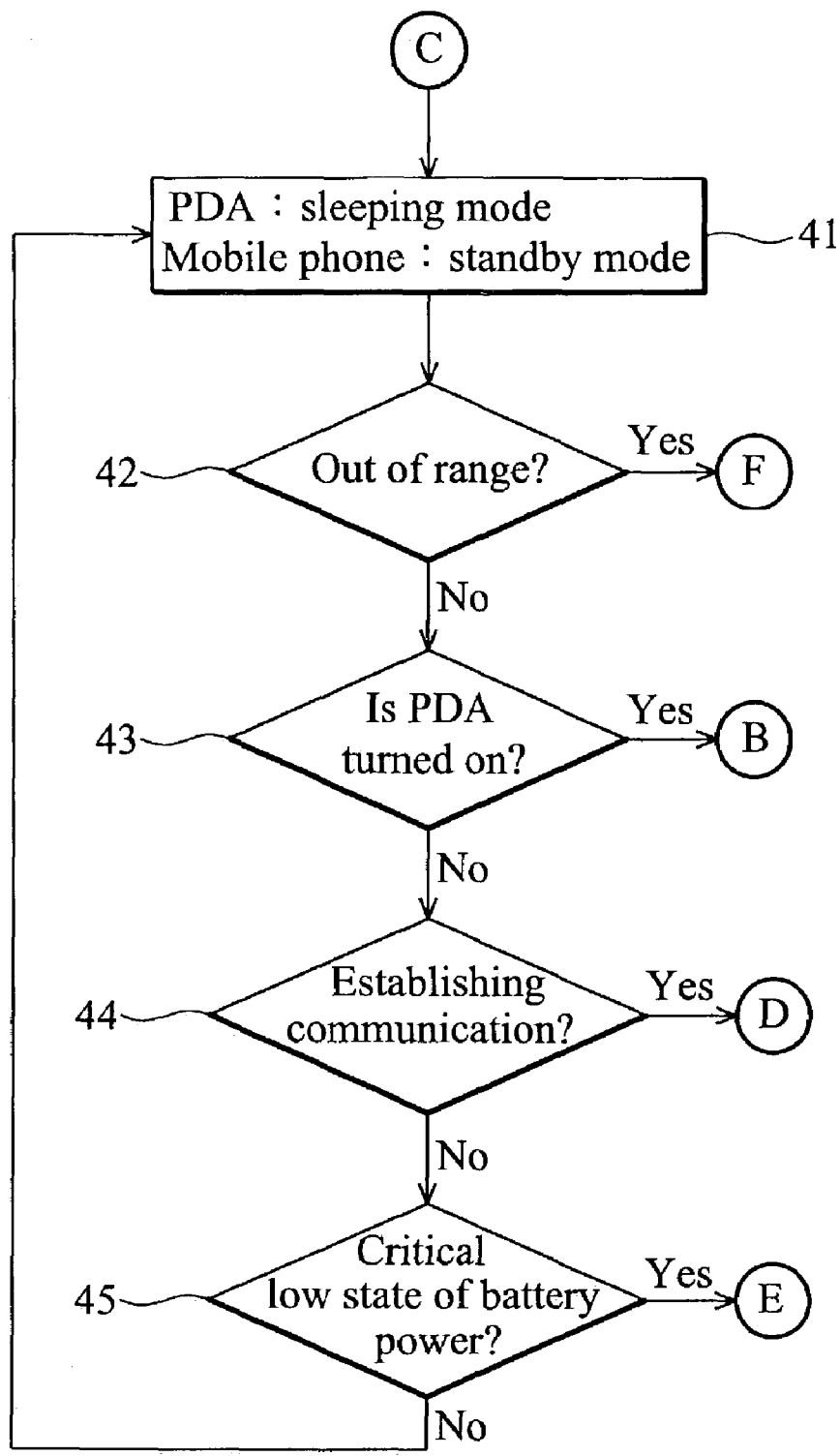
FIG. 4 is a flowchart of a sub-procedure C of a method for power management of a smart phone according to one embodiment of the invention.

FIG. 4 is a flowchart of sub-procedure C.

In step 41, the PDA system is operated in sleep mode while the mobile phone system is in standby mode.

In step 42, it is determined whether the smart phone is out of network range and has failed to connect to the network service. If so, sub-procedure F is implemented; otherwise, step 43 is implemented.

In step 43, it is determined whether the PDA system is turned on. If so, sub-procedure B is implemented; otherwise, step 44 is implemented.

In step 44, it is determined whether there is an outgoing or incoming call requiring the mobile phone system to establish communication with a remote terminal of the network. If so, sub-procedure D is implemented; otherwise, step 45 is implemented.

In step 45, power detection is implemented to determine whether the amount of power in the battery of the power system is less than the first threshold. If so, the battery is at a critically low level and sub-procedure E is implemented; otherwise, step 41 is implemented.

Figure 5:
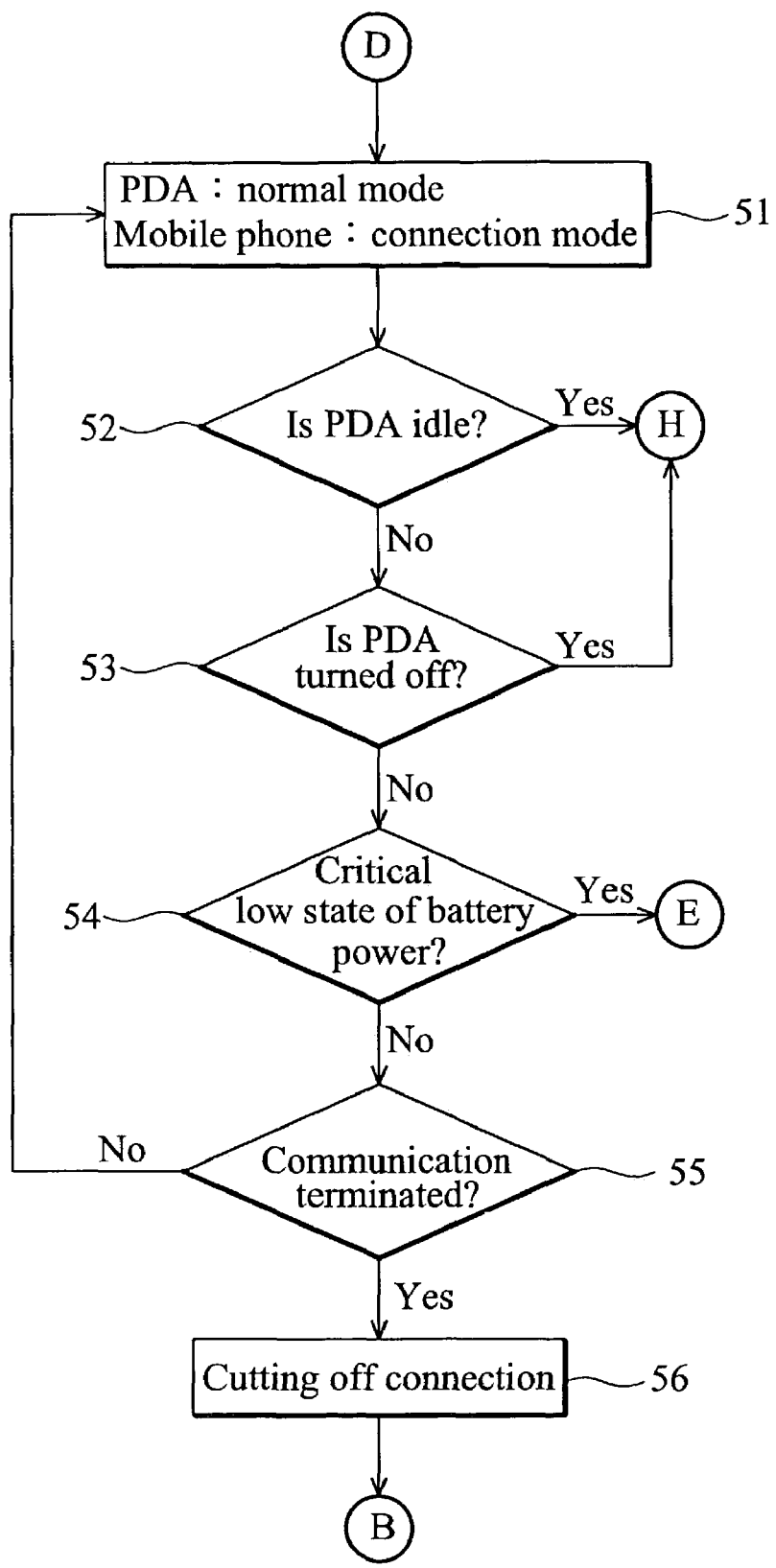
FIG. 5 is a flowchart of a sub-procedure D of a method for power management of a smart phone according to one embodiment of the invention.

FIG. 5 is a flowchart of sub-procedure D.

In step 51, the PDA system is operated in normal mode while the mobile phone system is in connection mode.

In step 52, it is determined whether the PDA system has been idle for a predetermined period of time, such as 5 minutes. If so, sub-procedure H is implemented; otherwise, step 53 is implemented.

In step 53, it is determined whether the PDA system is turned off. If so, sub-procedure H is implemented; otherwise, step 54 is implemented.

In step 54, power detection is implemented to determine whether the amount of power in the battery of the power system is less than the first threshold. If so, the battery is at a critically low level and sub-procedure E is implemented; otherwise, step 55 is implemented.

In step 55, it is determined whether communication is terminated. If so, step 56 is implemented; otherwise, step 51 is implemented.

In step 56, the connection between the mobile phone system and the remote terminal is cut off. Sub-procedure B is implemented.

Figure 6:
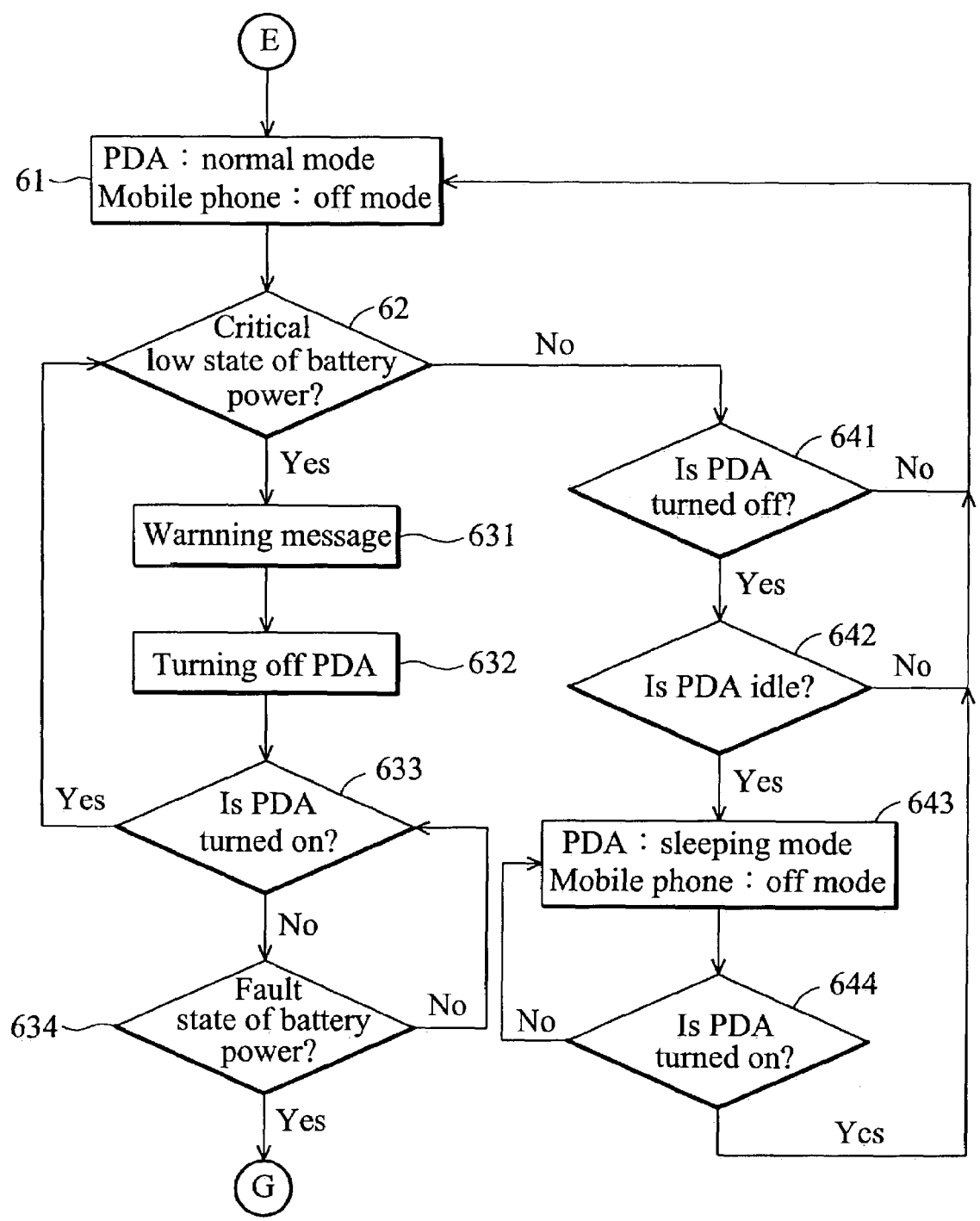
FIG. 6 is a flowchart of a sub-procedure E of a method for power management of a smart phone according to one embodiment of the invention.

FIG. 6 is a flowchart of sub-procedure E.

In step 61, the PDA system is operated in normal mode while the mobile phone system is in off mode.

In step 62, power detection is implemented to determine whether the amount of power in the battery of the power system is less than the first threshold. If so, the battery is at a critically low level and step 631 is implemented; otherwise, step 641 is implemented.

In step 631, the PDA system displays a warning message to inform the user of the critically low battery power level.

In step 632, the PDA system is switched to sleep mode.

In step 633, it is determined whether the PDA system has been engaged. If so, step 631 is implemented; otherwise, step 634 is implemented.

In step 634, power detection is implemented to determine whether the amount of power in the battery of the power system is less than the second threshold. If so, the battery is in fault state and sub-procedure G is implemented; otherwise, step 633 is implemented.

In step 641, it is determined whether the PDA system is turned off. If so, step 642 is implemented; otherwise, step 61 is implemented.

In step 642, it is determined whether the PDA system has been idle for a predetermined period of time, such as 5 minutes. If it has, step 61 is implemented; otherwise, step 643 is implemented.

In step 643, the mobile phone system is turned off and the PDA system is switched to sleep mode.

In step 644, it is determined whether the PDA system has been engaged. If so, step 61 is implemented; otherwise, step 643 is implemented.

Figure 7:
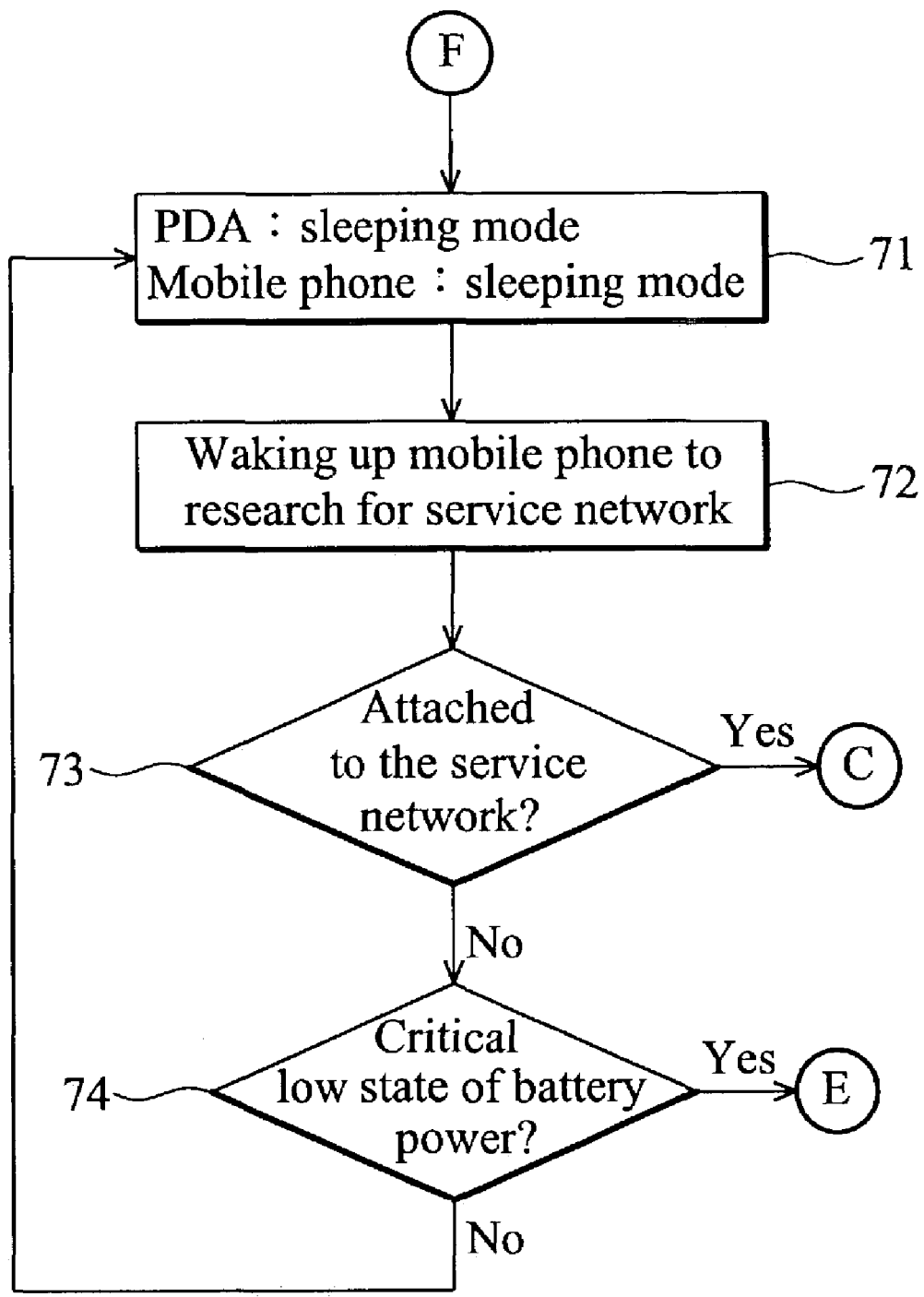
FIG. 7 is a flowchart of a sub-procedure F of a method for power management of a smart phone according to one embodiment of the invention.

FIG. 7 is a flowchart of sub-procedure F.

In step 71, both the PDA and mobile phone system are operated in sleep mode.

In step 72, the mobile phone system is engaged to search for network service while remaining in sleep mode for a predetermined period of time, such as 3 minutes.

In step 73, it is determined whether the mobile phone system has successfully connected to network service. If so, sub-procedure C is implemented; otherwise, step 74 is implemented.

In step 74, power detection is implemented to determine whether the amount of power in the battery of the power system is less than the first threshold. If so, the battery is at a critically low level and sub-procedure E is implemented; otherwise, step 71 is implemented.

Figure 8:
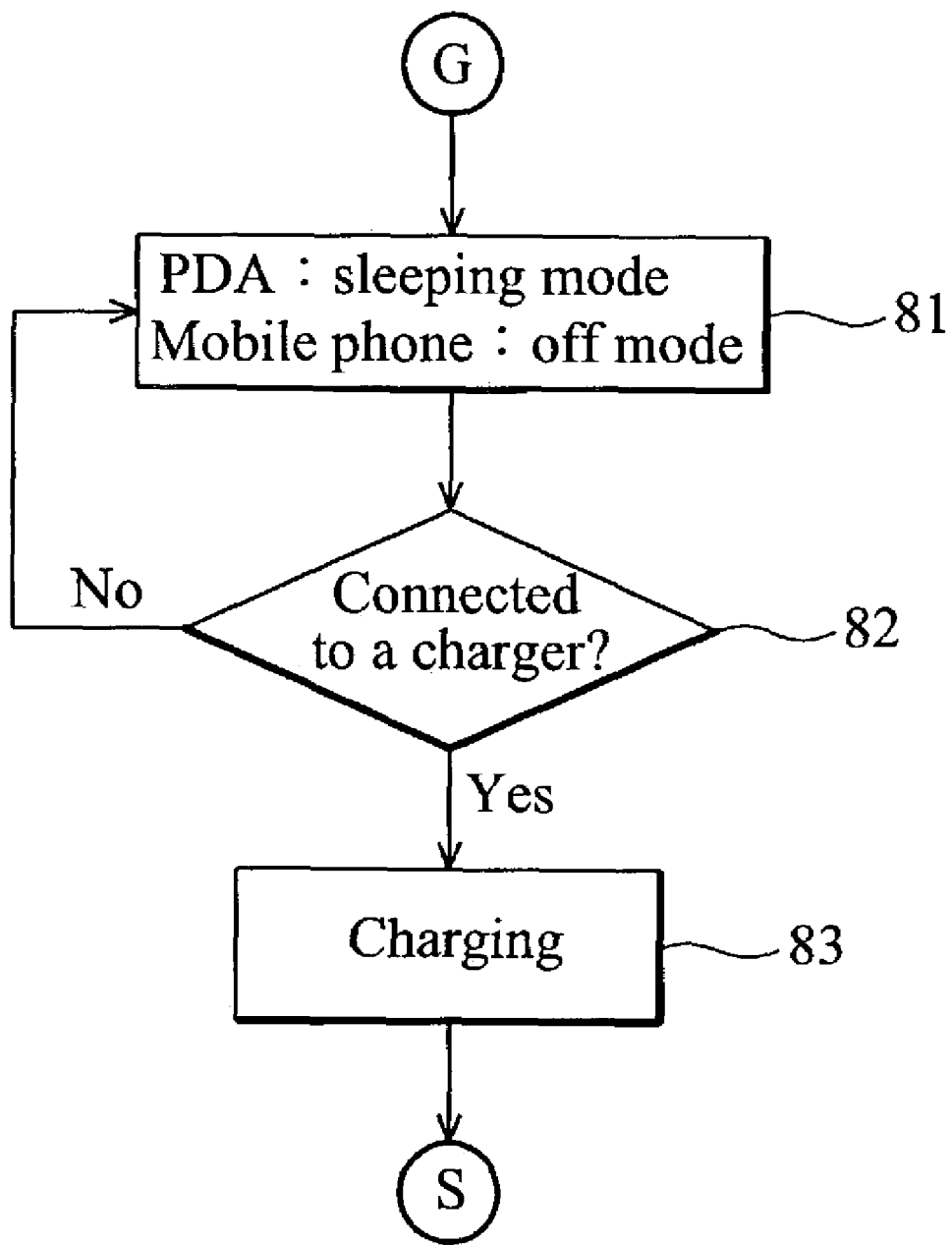
FIG. 8 is a flowchart of a sub-procedure G of a method for power management of a smart phone according to one embodiment of the invention.

FIG. 8 is a flowchart of sub-procedure G.

In step 81, the PDA system is operated in sleep mode while the mobile phone system is in off mode.

In step 82, it is determined whether the power system of the smart phone is connected to a charger. If so, step 83 is implemented; otherwise, step 81 is implemented.

In step 83, the battery in the power system is charged and step 11 of the main procedure S is implemented.

Figure 9:
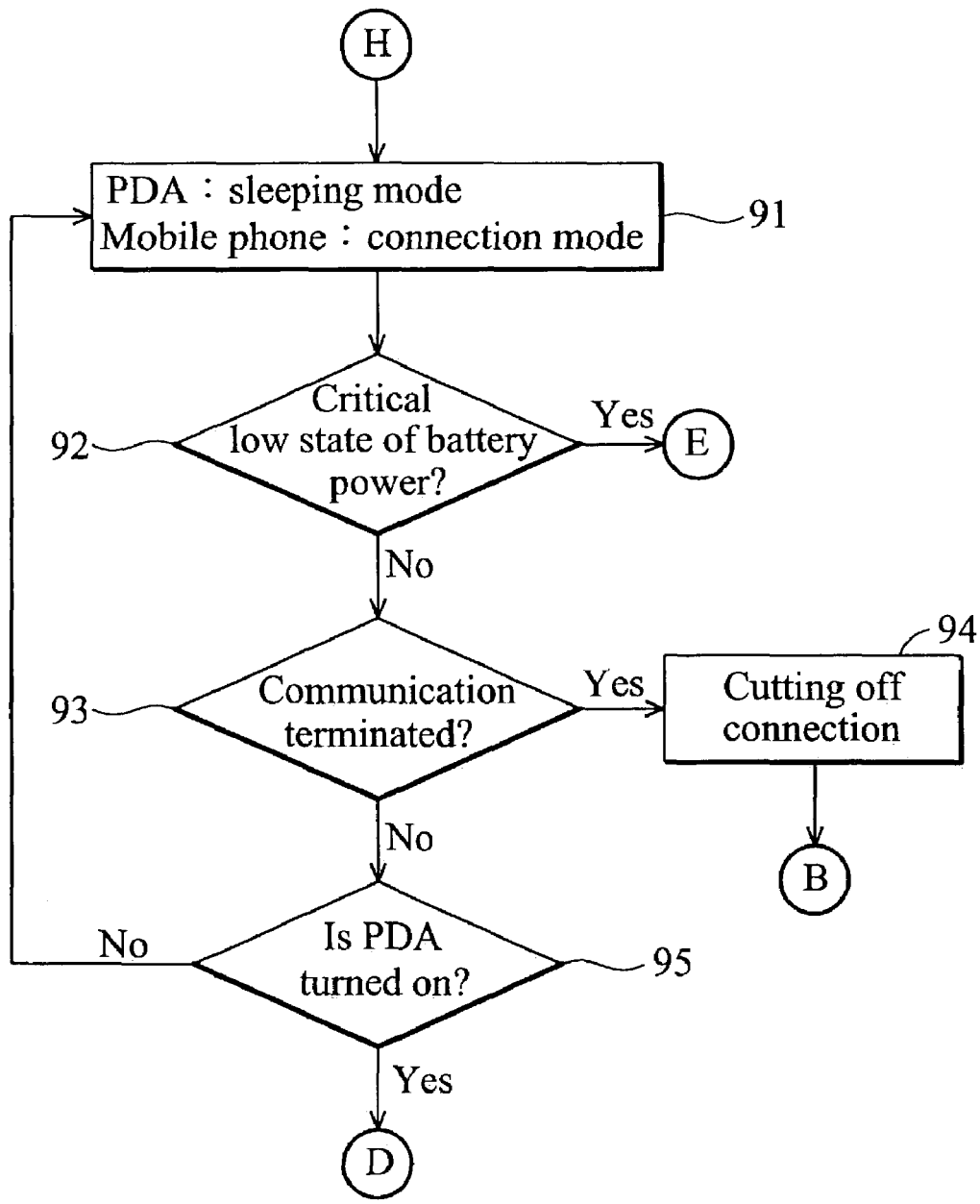
FIG. 9 is a flowchart of a sub-procedure H of a method for power management of a smart phone according to one embodiment of the invention.

FIG. 9 is a flowchart of sub-procedure H.

In step 91, the PDA system is operated in sleep mode while the mobile phone system is in connection mode.

In step 92, power detection is implemented to determine whether the amount of power in the battery of the power system is less than the first threshold. If so, the battery is at a critically low level and sub-procedure E is implemented; otherwise, step 93 is implemented.

In step 93, it is determined whether communication is terminated. If so, step 94 is implemented; otherwise, step 95 is implemented.

In step 94, the connection between the mobile phone system and the remote terminal of the network is cut off. Sub-procedure B is implemented.

In step 95, it is determined whether the PDA system has been engaged. If so, sub-procedure D is implemented; otherwise, step 91 is implemented.

Figure 10:
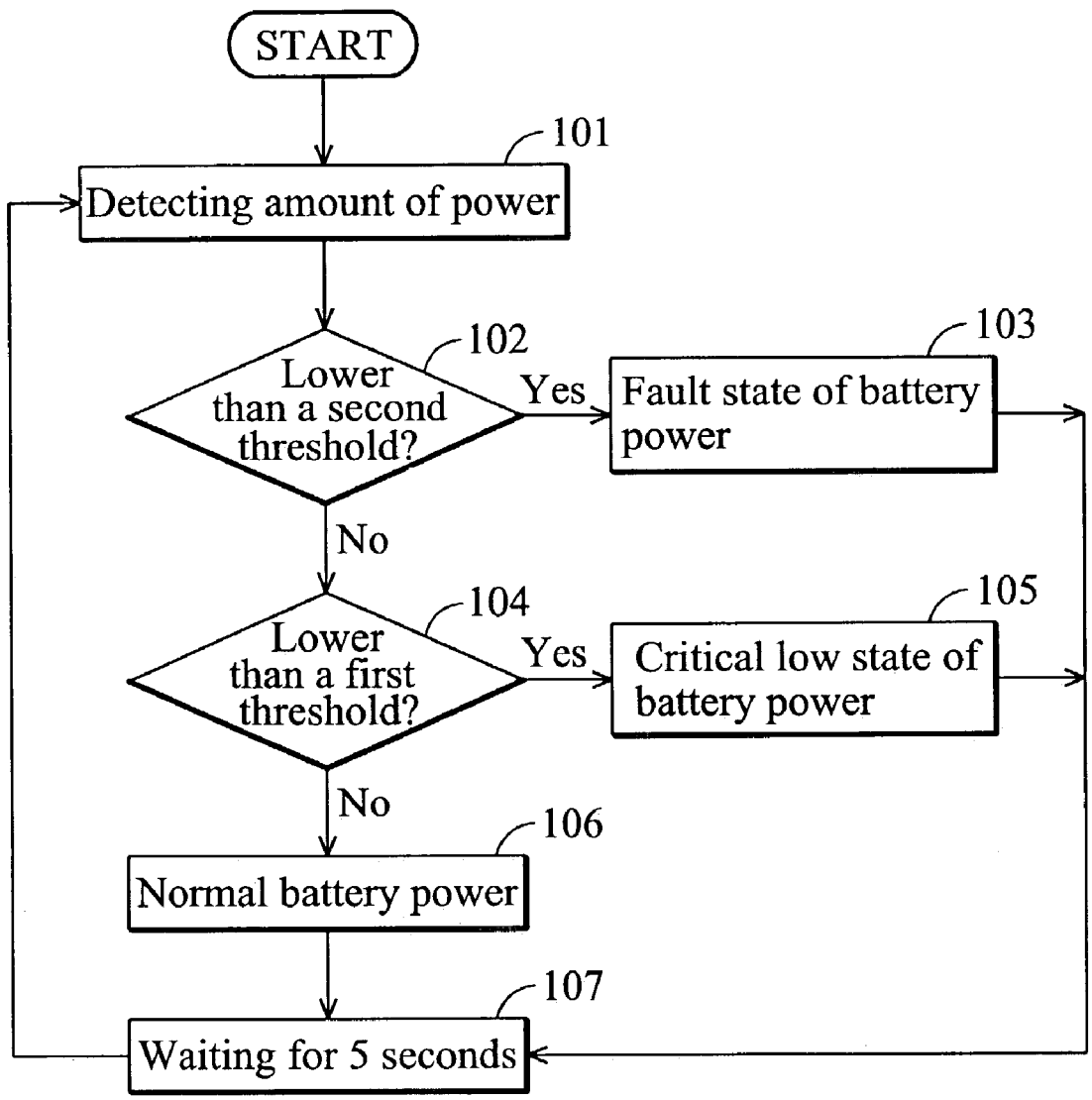
FIG. 10 is a flowchart of a power detection method according to one embodiment of the invention.

FIG. 10 is a flowchart of a method of the power detection for determination of the battery power level.

In step 101, the amount of power of the battery is detected.

In step 102, it is determined whether the detected amount of power is less than the second threshold. If so, step 103 is implemented; otherwise, step 104 is implemented.

In step 103, a critical low state of the battery power is reported.

In step 104, it is determined whether the detected amount of power is less than the first threshold. If so, step 105 is implemented; otherwise, step 106 is implemented.

In step 105, a fault state of the battery power is reported.

In step 106, a normal state of the battery power is reported.

In step 107, step 101 is implemented again 5 seconds later than any one of the reported states.

In the previously described embodiment of the invention, the smart phone is switched among the eight power modes. Particularly, the smart phone is allowed to switch from modes B, and D to H. That is to say, when the user communicates via the mobile phone system leaving the PDA system unused for a period of time, the PDA system will switch to sleep mode, consuming only partial power, thus avoiding unnecessary power consumption. Further, the PDA displays warning messages when the battery power is at a critically low level or in fault state, thus avoiding malfunctions or data loss due to the abnormal voltage supply of the battery.

In conclusion, the present invention provides an efficient power management system for a smart phone. When the user communicates via the phone and the PDA is left idle, the PDA will only be supplied partial power. Warning messages are displayed when the battery power is at a critically low level or in fault state. This achieves long battery life, and reduces unnecessary power loss due to system operation and avoids malfunctions or data loss due to the abnormal voltage supply of the battery.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A method for power management of a smart phone having a power system, a mobile phone system operated in a standby, sleep, connection or off mode, and a PDA system operated in a normal, sleep or off mode, the method comprising steps of:

resetting the smart phone;

searching for network service for the mobile phone system;

operating the mobile phone system in standby mode and the PDA system in normal mode when the network is located and connected to;

switching the mobile phone system from standby mode to connection mode when establishing communication with a remote terminal of the network;

switching the mobile phone system from standby mode to sleep mode when the mobile phone system has been idle for a first period of time;

switching the PDA system from normal mode to sleep mode when the PDA system has been idle for a second period of time; and implementing a power detection method comprising steps of:

detecting an amount of power of a source in the power system;

switching the mobile phone system to off mode when the detected amount is less than a first threshold; and switching the PDA system to off mode when the detected amount is less than a second threshold.

2. The method as claimed in claim 1 further comprising the step of:

switching the mobile phone system to sleep mode when the network fails to be either located or connected to.

3. The method as claimed in claim 2 further comprising the step of:

searching for network service while the mobile phone system remains in sleep mode for a third period of time.

4. The method as claimed in claim 1 further comprising the step of:
   switching the mobile system from connection mode to standby mode when the communication is terminated.

5. The method as claimed in claim 1, wherein the mobile phone system is switched to off mode when being turned off.

6. The method as claimed in claim 1, wherein the PDA system is switched from sleep mode to normal mode when being awoken.

7. The method as claimed in claim 1, wherein the PDA system is switched to off mode when being turned off.

8. The method as claimed in claim 1, wherein the second period of time is longer than the first period of time.

9. The method as claimed in claim 1, wherein the first threshold is larger than the second threshold.

10. The method as claimed in claim 1, wherein the power detection method is implemented every fourth period of time.

11. The method as claimed in claim 1, wherein the PDA system displays a warning message when the mobile phone system is switched to off mode due to the detected amount of power less than the first threshold.

12. The method as claimed in claim 1, wherein the PDA system displays a warning message when the PDA system is switched to off mode due to the detected amount of power less than the second threshold.

13. The method as claimed in claim 1, wherein the source of the power system is a battery.

14. The method as claimed in claim 1 further comprising steps of:
   charging the source in the power system; and
   switching the mobile phone system from off mode to standby mode when the amount of power of the source detected is larger than the first threshold.

15. The method as claimed in claim 1 further comprising steps of:
   charging the source in the power system; and
   switching the PDA system from off mode to normal mode when the amount of power of the source detected is larger than the second threshold.

* * * * *